United States Patent [19]
Costa et al.

[11] 3,722,389
[45] Mar. 27, 1973

[54] FOLDING CAMERA

[75] Inventors: Peter F. Costa, Winthrop; Edward H. Coughlan, Canton, both of Mass.

[73] Assignee: Polaroid Corporation, Cambridge, Mass.

[22] Filed: May 10, 1971

[21] Appl. No.: 141,554

[52] U.S. Cl. ............................. 95/39, 95/42, 95/47, 88/1.5 R
[51] Int. Cl. ............................................ G03b 17/04
[58] Field of Search ................... 95/32, 39, 40, 42, 47; 88/1.5 R

[56] References Cited

UNITED STATES PATENTS

| | | | |
|---|---|---|---|
| 2,641,955 | 6/1953 | Bretthauer | 95/47 X |
| 2,637,254 | 5/1953 | Faulhaber | 95/39 |
| 2,101,986 | 12/1937 | Crumrine | 95/40 |
| 2,192,394 | 3/1940 | Billing | 95/39 X |

Primary Examiner—Samuel S. Matthews
Assistant Examiner—Richard A. Wintercorn
Attorney—Brown and Mikulka, Alfred E. Corrigan and John S. Vale

[57] ABSTRACT

A compact folding camera including a viewing device for framing a scene to be photographed. The viewing device is mounted on one of a plurality of housing sections coupled for movement between folded and extended positions, and includes first and second optical elements, operatively associable for providing an image of the scene. The optical elements are mounted for movement relative to one another between operative viewing positions and inoperative storage positions. At least one of the optical elements is adapted to be moved between its inoperative and operative positions in response to movement of the housing sections between the folded and extended positions. A collapsible shade cooperates with other components of the viewing device to reduce the admission of ambient light between the first and second optical elements when they are located in their respective operative viewing positions.

39 Claims, 3 Drawing Figures

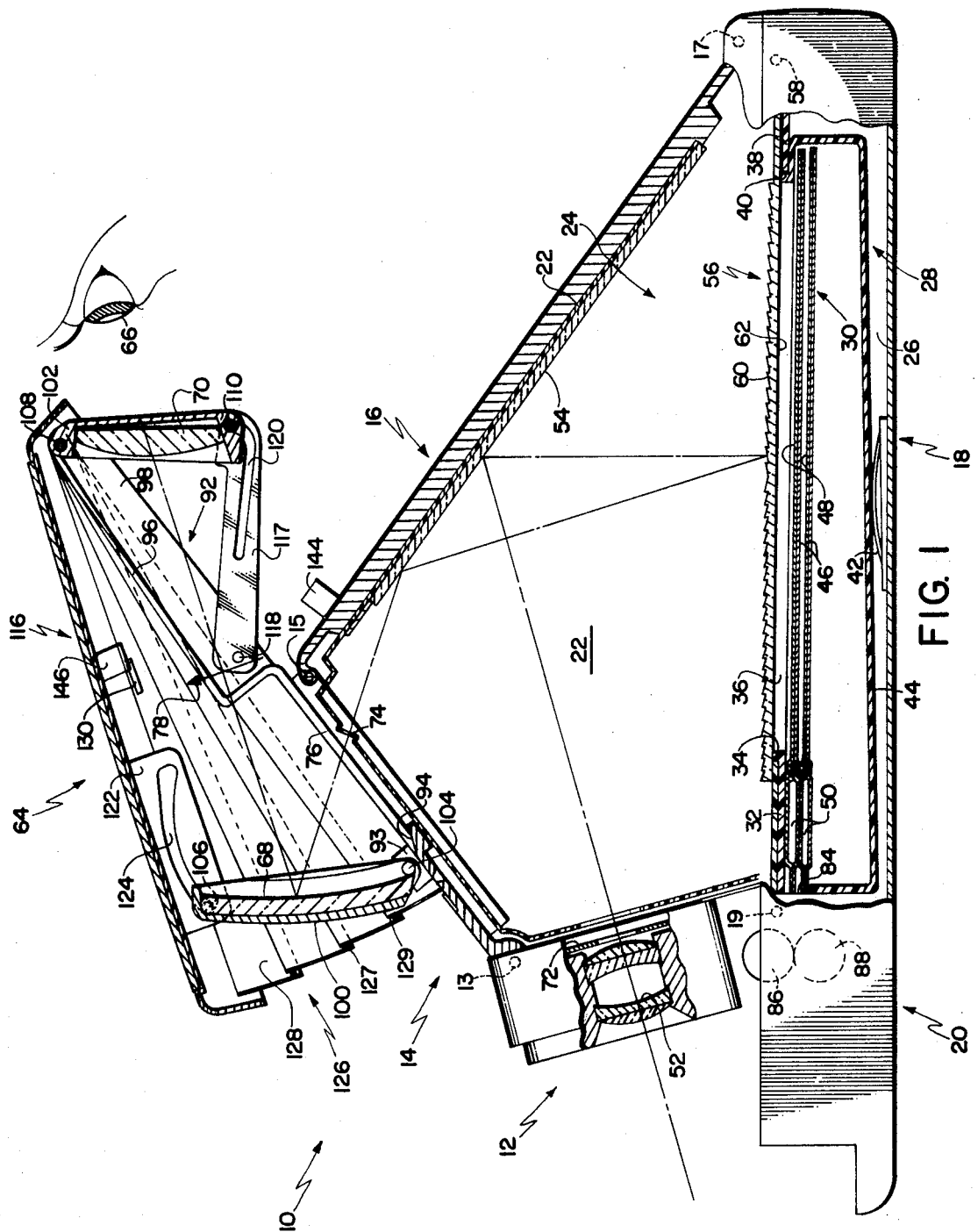

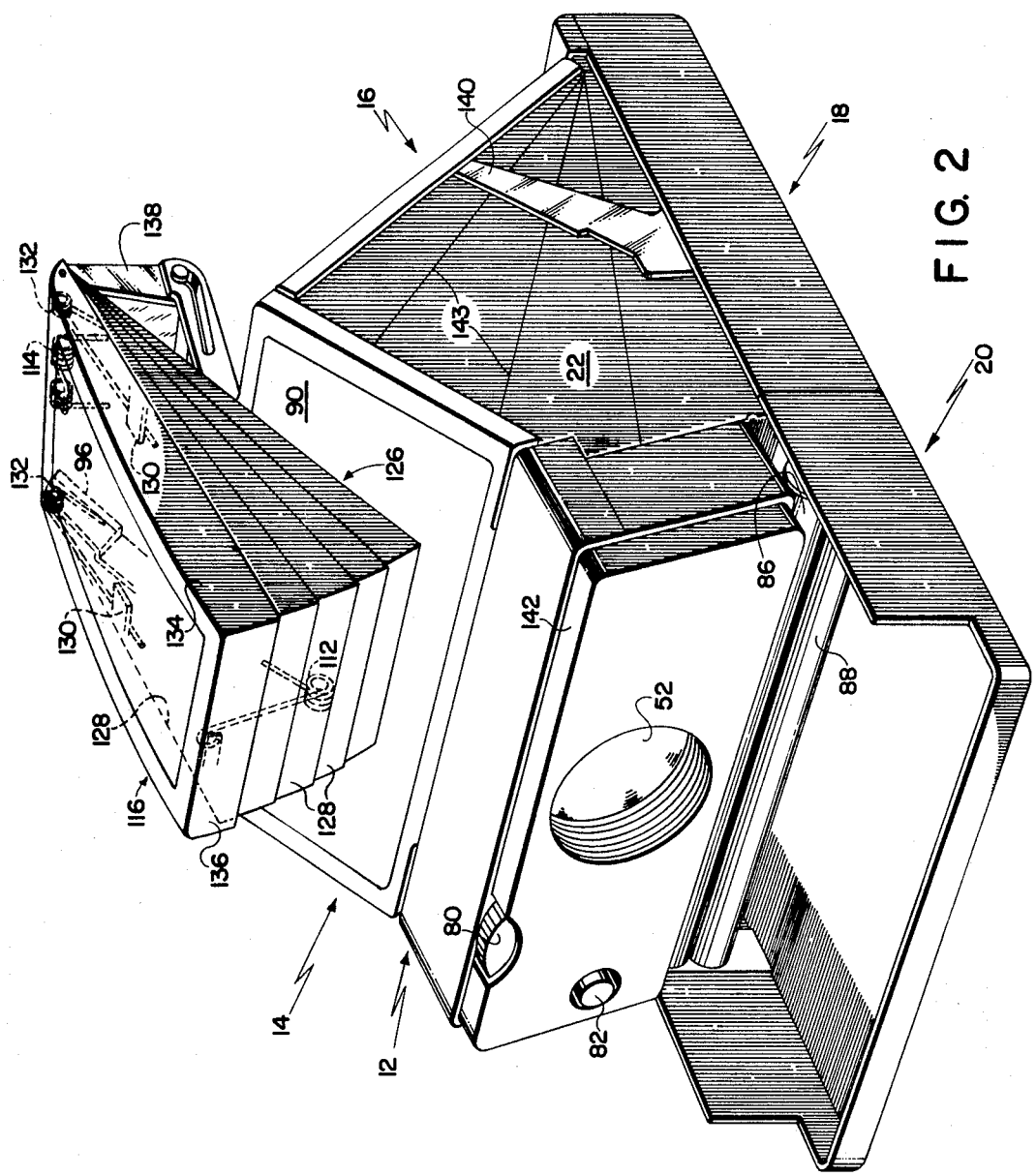

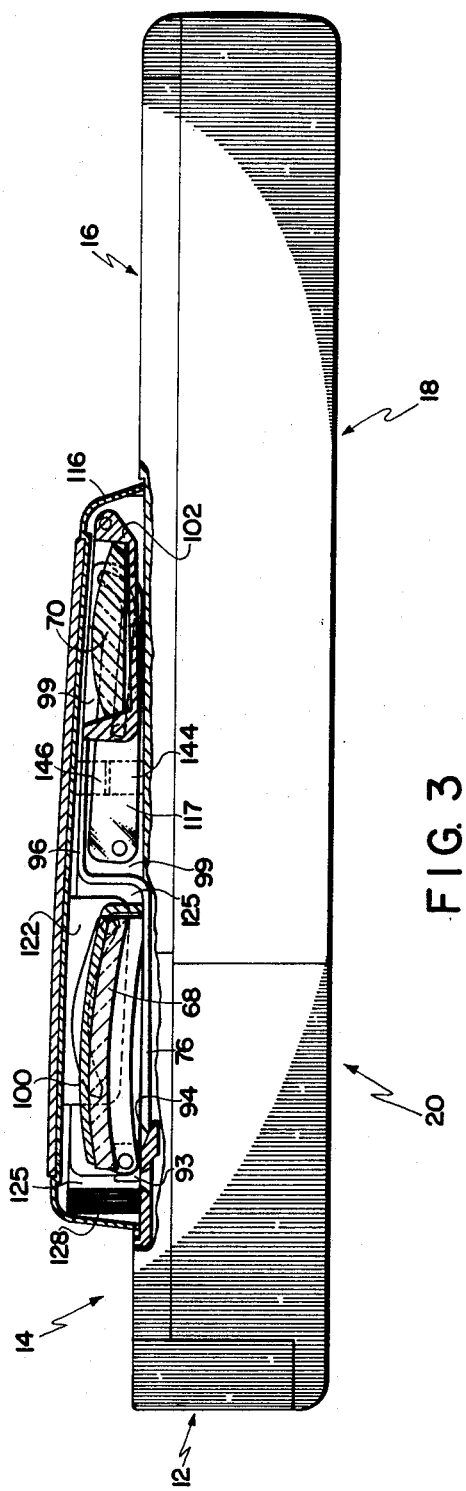

FOLDING CAMERA

BACKGROUND OF THE INVENTION

1. Field of the Invention

This invention relates to the field of folding photographic cameras of the type including a viewing device.

2. Description of the Prior Art

The folding camera, the traditional solution to the problem of providing a compact structure which is capable of exposing large format, e.g., snapshot-sized photosensitive materials, is as old as the recorded photographic art. While compactness has been achieved when these cameras are folded, generally, once erected, the camera is bulky, unbalanced, and usually difficult and uncomfortable to operate.

The most common design employs a vertical exposure plane positioned adjacent a vertical rear outer wall of the camera housing, an objective lens extending forwardly of the housing to establish a straight line optical path between the lens and the vertical exposure plane, and a viewing device mounted on the housing adjacent the rear outer wall through which the photographer looks to aim the lens at the scene to be photographed.

In use, the photographer usually holds the camera housing with two hands to aim the lens at a subject since most of the camera's weight is concentrated forwardly of the exposure plane, thereby making it difficult to manipulate the focusing mechanism and shutter release button with one or two free fingers. Framing a subject through the viewing device can be a frustrating experience. Frequently, he cannot place his eye close enough to the viewfinder because the vertical rear wall of the camera housing is incompatible with his facial contours. More often than not, when he finally positions his eye to look through the viewfinder, either his nose, cheek or forehead bears against the camera housing, and he finds it uncomfortable to hold the camera in this position for long periods of time, such as while waiting for an uncooperative child to assume an attractive pose. Also, the camera housing tends to block visual and oral communication with his subject, resulting in his having to repeatedly raise and lower the camera to communicate with his subject in preparation for making a photographic exposure.

A recent innovation in the design of folding cameras, namely the incorporation of folded optical paths into the optical system of the erected camera, has to a large extent eliminated the undesirable characteristics of the traditional folding camera. The folded optical path, in which light passing through the objective lens is reflected within the camera to change its direction, has several advantages. First, since it is not necessary to use a straight line optical path between the lens and the exposure plane, the camera designer is free to place the exposure plane in a horizontal rather than a vertical position. Secondly, physical spacing between the lens and the exposure plane is no longer equivalent to optical spacing since the optical path may be folded back on itself one or more times, resulting in a camera having much shorter forward-to-rear dimensions than the traditional folding camera design. This design concept is especially well suited for folding cameras of the self-developing type, such as that shown in U. S. Pat. No. 3,447,437, which are adapted to accept a film pack preloaded with a plurality of snapshot-sized film units.

The camera disclosed in the aforementioned patent is formed by a plurality of housing sections hinged together for relative movement between folded and extended positions. One housing section includes a chamber for receiving a film pack to locate the forwardmost film unit in the film pack at an exposure plane, another housing section supports the objective lens and exposure control components, e.g., a shutter and shutter release button. The remaining sections support the other components of the camera's optical system which include a mirror for reflecting light passing through the lens onto a film unit positioned at the exposure plane, thereby establishing the folded optical path, and a viewing device or viewfinder to aid the photographer in aiming the lens at the subject or scene to be photographed and determining the field of view covered by the objective lens for framing purposes.

The viewing device generally includes two or more optical elements for forming an image of the scene corresponding to that which will be formed by the objective lens at the exposure plane. The optical elements are usually rigidly mounted, in optical alignment with one another, in a housing which also serves to shade the optical path between the elements for reducing the admission of ambient light therebetween which may tend to obscure the image thereby making viewing and focusing difficult. In addition to the rigidly mounted or fixed optical elements, some viewfinder/rangefinders, especially of the focusing type or split image type, may further include movable optical elements.

To achieve maximum compactness, or to minimize the overall dimensions of the camera in the folded configuration, the two largest or thickest housing sections, namely the lens housing and the film pack housing are placed in end-to-end relation such that they cooperate to form a substantially rectangular parallelepiped structure. The placement of the rigid viewing device housing may be varied to achieve alternative design goals. If it is desirable to minimize the thickness of the folded camera, the viewing device housing may be located in side-by-side relation to the chamber for receiving the film pack as illustrated in the folding camera disclosed in the above mentioned patent. This configuration, while minimizing thickness, adds to the width of the camera. In another arrangement, the lens housing is placed at one end of the film pack housing and the viewfinder housing is placed at the opposite end, again minimizing the thickness of the folded camera but adding to its length.

For certain applications, such as to provide a camera that may easily be fitted into a coat pocket or a lady's handbag, it is desirable to minimize both length and width of the folded camera without substantially increasing the thickness of the camera. This may suggest placing the viewfinder housing in overlying relation to the film pack and lens housing, but the additional thickness of a rigidly constructed conventional viewfinder is unacceptable.

In erected or extended configuration, the folding camera utilizing the construction disclosed in the aforementioned patent is compact and well balanced. Taking advantage of the folded optical path, the exposure plane is positioned horizontally and the film pack housing may be held in the palm of one hand to support the erected camera thus leaving the other hand free to manipulate the focusing device and shutter release button. The lens housing and other housing sections form a tent-like structure, having inclined walls, over the film pack housing thereby giving the camera designer the opportunity to position the viewfinder such that the photographer's face does not bear against a vertical surface when he holds the camera in the viewing position.

While the placement of the viewing device in the above mentioned patent accomplishes the goal of minimizing the thickness of the folded camera, it will be noted that the optical axis of the viewfinder is at one side of the camera making it more comfortable for the photographer to look through the viewing device with his right eye rather than his left. Ideally, the viewfinder should be positioned such that it is convenient to use either the left or the right eye for viewing purposes. Also, the eye lens, or the optical element through which the photographer looks is mounted at the rear wall of the camera and better camera balance may be achieved by placing the eye lens over the camera between the forward and rear walls.

SUMMARY OF THE INVENTION

The present invention provides a compact folding camera which includes a viewing device for providing an image of a scene or subject to be photographed. The camera is formed by a plurality of interconnected housing sections, including first and second housing sections, which are coupled for movement between folded and extended positions. The viewing device is mounted on the first housing section and comprises first and second optical means, including first and second optical elements, coupled to the first housing section for movement relative thereto and to one another between inoperative and operative positions. In the inoperative position, the first and second optical elements are folded flat against the first housing section for storage and are movable to the operative position in which they extend outwardly from the first housing section, in optical alignment with one another, thus cooperating to provide an image of the scene or subject to be photographed.

The viewing device further includes means which are responsive to relative movement of the first and second housing sections between the folded and extended positions for moving at least one of the first and second optical elements between its inoperative and operative positions.

The viewing device is provided with an erecting system comprising means biasing the optical elements toward their operative position and erecting means, including erecting links coupled between the optical elements and the first housing section. The erecting links are movable between positions locating and maintaining the first and second optical elements in their respective inoperative and operative positions. The camera is configured such that at least one of the erecting links is positioned to engage the second housing section when the camera is folded for moving one of the optical elements from its operative position to its inoperative position as the first and second housing sections are moved to the folded position. Upon moving the first and second housing sections form the folded to the extended position the same erecting link is adapted to be disengaged from the second housing section thereby permitting the one optical element to automatically move under the influence of the biasing means to its operative position.

Means are provided for reducing the admission of ambient light between the first and second optical elements when they are located in their respective operative positions. This prevents the ambient light from obscuring the image formed by the optical elements. The means for excluding ambient light include a collapsible shade adapted for movement between a compact collapsed storage position and an erected or light-blocking position, a housing which couples one of the optical elements to the first housing section, and a cover, or cover means, associated with the viewing device.

The cover also functions as part of the viewing device erecting system; cooperates with the first and second housing section to form a protective covering for the optical elements and the collapsible shade; and includes a latching member adapted to engage a mating latching member on the second housing for releasably locking the first and second housing sections in the folded position.

The compact folding camera embodying the instant invention is characterized by the placement of the viewing device in overlying relation to the first and second housing sections when the camera is in the folded position thus minimizing the length and width of the folded camera.

Another characterizing feature of the camera is that the viewing device is foldable or collapsible and is adapted to have a low vertical profile when in the inoperative position in comparison to its vertical profile when extended, thus minimizing the addition of thickness to the folded camera.

Yet another characterizing feature of the camera embodying the present invention is that at least one of the optical elements forming the viewing device is automatically moved between its inoperative and operative positions in response to movement of the first and second housing sections between the folded and extended position.

Also, the camera is configured such that when extended the photographer may look through the viewing device with either his left or right eye without portions of his face contacting the camera or viewing device so as to make viewing and focusing more comfortable.

Therefore, it is an object of the present invention to provide a compact folding camera having first and second housing sections coupled for movement between folded and extended positions, a viewing device including first and second optical elements movably coupled to the first housing section, and means responsive to movement of the first and second housing sections from the folded position toward the extended position for moving at least one of the first and second optical elements from a compact, folded, inoperative position to an extended, operative position.

It is another object of the present invention to provide a compact folding camera of the type described having means responsive to movement of the first and second housing sections from the extended position toward the folding position for moving at least one of the first and second optical elements from the operative position to the inoperative position.

It is yet another object of the present invention to provide a compact folding camera of the type described having means responsive to movement of the first and second housing sections between the folded and extended positions for moving at least one of the first and second optical elements between the inoperative and operative positions.

It is a further object of the present invention to provide a compact folding camera of the type described with means for reducing the admission of ambient light between the first and second optical elements when the optical elements are in their respective operative positions.

It is yet another object of the present invention to provide a camera of the type described with cover means associated with the viewing device which: (1) serves as part of an erecting system for moving at least one of the optical means between its operative and inoperative position; (2) reduces the admission of ambient light between the first and second optical elements when they are in their respective operative positions; and (3) cooperates with the first and second housing sections in the folded position to form a protective cover for the first and second optical means.

Other objects of the invention will in part be obvious and will, in part, appear hereinafter.

The invention accordingly comprises the apparatus possesing the construction, combination of elements, and arrangement of parts which are exemplified in the following disclosure and the scope of the application which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is an elevational view, partly in section, of a camera embodying the instant invention shown in its extended or operative position;

FIG. 2 is a perspective view of the camera embodying the instant invention shown in its extended or operative position with selected components of a viewing device shown in dotted lines; and FIG. 3 is an elevational view, partly in section, of the camera shown in FIGS. 1 and 2 in its folded or inoperative position.

DESCRIPTION OF THE PREFERRED EMBODIMENT

Referring now to FIGS. 1, 2, and 3 of the drawings, a foldable, single lens reflex camera of the self-developing type is shown, generally, at 10 in its extended or operative position. Camera 10 includes a plurality of housing sections 12, 14, 16, and 18 pivotally coupled to one another at pivots 13, 15, 17, and 19 (see FIG. 2) for relative movement between an extended position as shown in FIG. 1, and a compact folded position, as shown in FIG. 3, and a housing section 20 extending forwardly of housing section 18.

When extended, housing sections 12, 14, 16 and 18 cooperate with a collapsible bellows 22, secured thereto, to form a six-sided exposure chamber 24. Housing section 20 is pivotally coupled to housing section 18 for movement downwardly, in a counter-clockwise direction, thus providing access to a chamber 26, located within housing section 18, for receiving a film container 28 preloaded with a plurality of stacked film units 30.

Film container 28 includes a forward wall 32 having an upstanding rib 34 which defines a generally rectangular light-transmitting section or aperture 36 through which actinic radiation is adapted to pass to expose the forwardmost film unit. The film container 28 is supported, within chamber 26, at its forward wall by a plate-like support frame 38 having a rectangular opening 40 therein through which upstanding rib 34 is adapted to be inserted in telescoping fashion for accurately locating the forwardmost film unit at an exposure plane within camera 10. A support spring 42 secured to the interior surface of the bottom wall of housing section 18 is adapted to engage a rear wall 44 of the film container for holding it securely against support frame 38.

Film unit 30 contains all of the components required to produce a positive photographic print and generally includes a photosensitive element 46, a superposed transparent image-receiving element 48, and, joined to both elements at one end, a rupturable pod 50 containing a processing fluid which is adapted to be spread between and in contact with each element, subsequent to exposure, for forming a positive image by a diffusion transfer process as is well known in the photographic art. For details as to the construction of film units 30, reference may be had to U. S. Pat. No. 3,415,644, granted on Dec. 10, 1968, to E. H. Land, and assigned to the same assignee as the instant invention.

The camera's optical system includes an objective lens 52, mounted in housing section 12, for forming an image of the scene to be photographed; a planar mirror 54, mounted on an interior wall of housing section 16, for reflecting light passing through objective lens 52 towards the exposure plane; and a plate-like reflex member 56, pivotally coupled to housing section 18 at pivot 58 for movement between a first position, as shown in FIG. 1, and a second position closely adjacent and parallel to fixed planar mirror 54. Reflex member 56 has a viewing surface, or a focusing screen 60, on one side for displaying the image formed by objective lens 52, via reflection from planar mirror 54, and a planar reflective surface 62 on the other side, the function of which will be described hereinafter. The camera's optical system further includes a viewing device shown generally at 64 for viewing the image displayed on the focusing screen 60 from an eye station designated generally at 66. The optical portion of the viewing device 64 is formed by a curved mirror 68 and an eye lens 70.

Camera 10, being of the single lens reflex variety, is configured to operate first in a viewing and focusing mode of operation and thereafter in an exposure and processing mode. As best seen in FIG. 1, during the viewing and focusing mode of operation, reflex member 56 rests in lighttight engagement atop frame 38 in closing relation to the film container exposure aperture 36. A normally opened shutter 72, mounted behind objective lens 52, permits light to pass through the lens and across chamber 24 until it impinges upon mirror 54 which is positioned to reflect the light onto the focusing screen 60 to form an image of the scene to be photographed. The focusing screen 60, on one side of reflex member 56, may take the form of an echelon type mirror as diagrammatically illustrated in FIG. 1. Light emanating from the image formed on focusing screen 60 is reflected upwardly toward planar mirror 54 from which it is reflected toward housing section 14. The light passes through a small aperture 74 in bellows 22, which defines an entrance pupil for the viewing device 64, and then through a large aperture 76 in section 14 until it impinges upon curved mirror 68. Curve mirror 68 has a concave ellipsoidal shaped reflective surface which reflects the light rearwardly toward eye station 66. The concave mirror forms a real, erect, and unreverted aerial image, designated by a vertical arrow 78 which is then magnified by the eye lens 70 to facilitate viewing and focusing from the eye station 66.

In operation, the photographer views the aerial image through eye lens 70 while adjusting a focusing wheel 80, (see FIG. 2), mounted on housing section 12 which is coupled to objective lens 52 for moving the lens forwardly or rearwardly to focus on subjects at varying distances from the camera. Once the image on the focusing screen 60, as viewed through the viewing device 64, is in sharp focus, the photographer actuates a shutter release button 82 mounted on housing section 12. Actuation of button 82 enables an appropriate expose control system (not shown) which is adapted to initiate and control the following sequence of operations. First, the normally open shutter 72 closes and a blocking member (not shown) blocks aperture 74 in bellows 22 thus causing exposure chamber 24 to assume a lighttight condition. Reflex member 56 is pivoted upwardly, about pivot 58, to the exposure position closely adjacent to and parallel with fixed mirror 54 thereby uncovering the light-transmitting section or exposure aperture 36 in the film container 28. The shutter 72 is then opened to admit light into the exposure chamber 24 which is then reflected from the planar reflecting surface 62 on the underside of reflex member 56 onto the forwardmost film unit 30 thereby causing exposure of the film unit. After an appropriate exposure interval, the shutter again closes and the reflex member 56 is pivoted downwardly to its viewing and focusing position thus capping the exposure aperture 36 in the film container after which the shutter 72 is opened and the viewing device aperture 74 is unblocked.

Subsequent to exposure, the exposed film unit 30 is automatically advanced, by means not shown, forwardly through a withdrawal slot 84 in the forward end wall of the film container and into engagement with a pair of pressure-applying rollers 86 and 88 which are adapted to apply compressive pressure to the film unit as it advanced therebetween. The compressive pressure causes the pod 50 to rupture, thereby dispensing the processing fluid which is then uniformly distributed between and in contact with the photosensitive element 46 and the image-receiving element 48 to initiate the diffusion transfer process.

A more detailed description of the optical system employed in the instant camera may be found in the co-pending U. S. Patent application of J. G. Baker, U. S. Ser. No. 98,356, filed Dec. 15, 1970, and assigned to the same assignee as the instant invention.

As noted earlier, camera 10 is of the folding variety and is adapted to be moved between the extended position shown in FIG. 1 and the compact folded position shown in FIG. 3. The viewing device 64 is also adapted to be folded or collapsed such that it has a low vertical profile when folded as shown in FIG. 3 as compared to its vertical profile when it is extended or in the operative position as shown in FIG. 1.

As best shown in FIG. 2, housing section 14 includes a generally flat, rectangular forward portion 90 and an integrally formed, upwardly and rearwardly extending, offset portion 92 (see FIG. 1). The forward portion 90 is pivotally coupled at its ends to housing section 12 at pin 13 and to housing section 16 at pin 15 and includes a downwardly bevelled portion 94 which defines the bounds of aperture 76.

Referring now to FIG. 1, it will be noted that the elevational section is taken along the optical center line of the viewing device, which is basically a symmetrical structure, so that when reference is made to a pair of arms or a pair of erecting links, etc. it is understood that only one of the pair is illustrated in FIG. 1. The rearwardly extending portion 92 of housing section 14 includes a pair of laterally spaced arms 96 extending upwardly and rearwardly from the forward portion 90. Depending from each of the arms 96 is a thin vertical flange 98 which cooperate with one another to define a recess portion 99 (see FIG. 3) between the two spaced arms 96.

The concave mirror 68 and the eye lens 70 are coupled to housing section 14 by means of a mirror housing 100 and an eye lens housing 102. Mirror housing 100 is essentially a rectangular structure having a recess or depression for receiving the curved mirror 68. The mirror housing 100 is pivotally coupled at its lower extremity to a pair of mounting blocks 93 on forward portion 90 by a pair of pivot pins 104 and also includes a pair of outwardly extending pins 106 located at its upper extremity, the function of which will be described hereinafter. The eye lens housing 102 is in the form of a substantially rectangular open frame adapted to receive and hold the outer perimeter of the eye lens 70. The lens housing 102 is pivotally coupled between the arms 96 and depending flanges 98 by means of a pivot 108 passing through the upper end of lens housing 102 and the rearwardmost end of arms 96. The lens housing 102 also includes a pair of outwardly extending pins 110 located at the lower end of the housing the function of which will be described hereinafter.

The viewing device 64 is provided with an erecting system for moving the optical elements and their respective housings 100 and 102 between the operative position, in which the optical elements extend outwardly from housing section 14, shown in FIG. 1 and the compact, folded, inoperative position wherein the optical elements are contained in substantially the same plane as housing section 14 and are positioned in end to end relation with one another, shown in FIG. 3. The erecting system includes means biasing the mirror 68 and the lens 70 outwardly from housing section 14 toward their respective extended positions. As best shown in FIG. 2, the biasing means include a mirror housing spring 112 having a helically wound center portion circumscribing pivot pin 104, at the lower end of the mirror housing 100, with one end of the spring 112 bearing against the upper portion of the mirror housing 100 and its other end bearing against forward portion 90 of housing 14. A lens biasing spring 114 is provided having two helically wound portions circumscribing pivot 108, a medial portion bearing against the interior surface of a viewfinder cover 116 (to be described hereinafter) and two free ends bearing against the lens housing 102 thus resiliently urging it outwardly from the rearwardly extending portion 92 of housing section 14.

The erecting system further includes a pair of erecting links 117 pivotally coupled at one end to depending flanges 98 at pivots 118 and having a thin curved slot or groove 120 therein through which pin 110, located at the lower end of the lens housing 102, is adapted to extend, thus coupling the lens housing 102 to the erecting links 117. The slot 120 defines a camming surface for pin 110 with the rearward end of the slot providing a stop against which the lens housing spring 114 urges pin 110 to accurately locate the lens 70 in the operative position, as shown in FIG. 1. As link 117 is pivoted in a counterclockwise direction about pivot 118, the lens housing pin 110 follows the camming surface defined by slot 120 and is moved against the bias of spring 114 to a position wherein it is located in the recess 99 formed between arms 96 and flanges 98, as best seen in FIG. 3.

The viewfinder cover 116 also forms part of the viewfinder or viewing device erecting system by serving as an erecting link for mirror 68. Cover 116 is pivotally coupled near its rearward end to arms 96 at pivot 108 and includes a pair of laterally spaced vertically depending flanges 122 secured to its interior surface. Flanges 122 have curved slots or tracks 124 therein through which the outwardly extending pins 106, located at the upper end of the mirror housing 100, are adapted to extend thus coupling the mirror housing 100 to cover 116. The curved slots 124 define camming surfaces for pins 106 with the forward end of the slot 124 (to the left as viewed in FIG. 1) functioning as a stop against which spring 112 urges pin 106 to accurately locate the mirror 68 in its extended, operative position, as shown in FIG. 1. As cover 116 is rotated in a counterclockwise direction about pivot 108, pin 106 follows the camming surface of slot 124 and rotates mirror housing 100 in a clockwise direction about pivot 108, pin 106 follows the camming surface of slot 124 and rotates mirror housing 100 in a clockwise direction, about pivot 104, to its folded position within a recessed portion 125 of housing section 14. Recessed portion 125 is defined by the outer surface of forward portion 90 and the upwardly extending portion of arms 96, as shown in FIG. 3.

To increase the apparent brightness of the image formed by concave mirror 68 at position 78, it is desirable to reduce the admission of ambient light between the concave mirror 68 and the eye lens 70 when the camera is in the erected or extended position. The means for reducing admission of ambient light include the viewing device cover 116, the eye lens housing 102, and a collapsible shade 126.

The collapsible or folding shade 126 is formed by a plurality (four) of thin elongated U-shaped blades 128 pivotally coupled near the free ends of the U to the rearwardly extending portion 92 of housing section 14 at pivot 108. It will be noted from FIG. 1 that the lowest or first blade 128, which is fixedly attached at its forward end to the forward portion 90 of housing section 14 is of minimum length, measured from pivot 108, and that each succeeding blade is slightly longer than the one below it. This permits the blades to nest in telescoping fashion as the upper three blades are pivoted downwardly in counterclockwise direction, until their bottom edge bears against housing section 14. The three uppermost blades 128 have inwardly turned flanges 127 at their forward bottom edges and the three lower blades have outwardly turned flanges 129 at their upper forward edges which are adapted to interlock as the upper three blades 128 are rotated upwardly from housing section 14 for sequentially erecting the blades to the positions shown in FIG. 1. It will be noted, that in the erected position, the individual blades 128 overlap one another thus preventing ambient light from passing therebetween. Shade 126 is spring biased towards the erected or light-blocking position by a pair of springs 132. Each spring 132 is wound around pivot 108 and has one free end secured under an inwardly turned flange 130 on the uppermost blade 128 and its other free end bearing against arm 96, thus biasing the uppermost blade to rotate about pivot 108 in a clockwise direction.

In another embodiment, the blades 128 may be interconnected by a flexible tape in such a manner as to permit them to be moved between the collapsed and erected positions thus eliminating the need for the interlocking flanges 127 and 129 at the forward end of the blades. Additionally, the uppermost blade 128 may be resiliently coupled to the interior surface of cover 116 so that the shade 126 is moved to the erected position as the cover 116 is raised to located mirror 68 in the operative position. This would eliminate the need for the inwardly turned flanges 130 in the uppermost blade 128 and the shade biasing springs 132.

When the viewing device 64 is in the fully erected position, the uppermost blade 128 of the shade 126 telescopes inside cover 116 and cooperates with depending sidewalls 134 and forward end wall 136 of cover 116 to form a light barrier therebetween. The lens housing 102 is configured such that a pair of sidewalls 138, only one of which is shown, extend forwardly of the lens 70 and toward the mirror 68 and serve to further reduce admission of ambient light between mirror 68 and lens 70. In use, the top of the cover 116 shades the optical path between the concave mirror 68 and eye lens 70 from overhead radiation while the cover sidewalls 134 and end wall 136, shade 126, and lens housing sidewalls 138 shade the optical path from radiation emanating from the sides of the camera.

As has been previously noted, housing sections 12, 14, 16, and 18 are pivotally coupled to one another at pivots 13, 15, 17, and 19 for relative movement between the extended position shown in FIG. 1 and the folded position shown in FIG. 3. As best seen in FIG. 2, an erecting link 140, having one end pivotally coupled to an interior sidewall of housing section 16 and the opposite end slidably coupled to an interior sidewall of housing section 18, is provided for maintaining the housing sections in the extended position. Link 140 is adapted to be latched in the position shown in FIG. 2 and is releasable by applying a downward thrust to the link which causes it to unlatch and slide forwardly. Housing sections 12, 14, and 16 may then be moved downwardly toward housing sections 18 and 20 with housing section 12 pivoting about pin 19, in a counterclockwise direction, and rotating into the forward portion of housing section 20. The forward portion of housing section 20 is adapted to overlie a forwardly extending portion 142 of housing section 12 thus forming a protective cover for lens 52, the lens focusing wheel 80, and the shutter release button 82. The forward portion 90 of housing section 14 and housing section 16 cooperate to form a continuous planar outer cover of the camera which is positioned in overlying relation to housing section 12 and housing section 18 when the camera is folded, thus, providing a generally parallelepiped shaped compact structure. As the housing sections are moved from the extended position to the folded position, bellows 22 collapses along creases or memory lines 143 and is adapted to be stored between the upper housing sections 14 and 16 and the lower housing sections 12, 18, and 20.

As housing sections 12, 14, and 16 are moved toward the folded position, housing section 14 rotates in a clockwise direction about pivot 15 causing the rearwardly extending portion 92 of housing section 14 to move toward the outer wall of housing section 16. This causes the eye lens erecting link 117 to engage the outer surface of housing section 16 resulting in a counterclockwise rotation of link 117 about pin 118 as the housing sections are moved closer to the folded position. Pivot pin 110, located at the lower portion of the lens housing 102, follows the curved camming surface of slot 120 causing the lens housing 102 to rotate in a clockwise direction about the pivot 108 thereby moving the eye lens 70 from its extended position to its folded position, within the recess 99 formed by rearwardly extending arms 96 and depending flanges 98, as shown in FIG. 3. The viewfinder cover 116 is then manually moved downwardly in a counterclockwise direction about pivot 108, with the pins 106, at the upper end of the mirror housing 100, following the camming surface defined by slot 124 thus causing the mirror housing 100 to pivot in a clockwise direction about pin 104. This results in the movement of the mirror housing 100 from its extended position shown in FIG. 1 to its folded position within the recess 125 formed by the forward portion 90 of housing section 14 and arms 96. As cover 116 is moved downwardly, it engages the inwardly extending flanges 130 on the uppermost blade 128 of shade 126 thereby rotating the upper blade, in a counterclockwise direction about pivot 108, against the bias of springs 132 resulting in the folding of the shade 126 into its nesting or telescoping configuration as best shown in FIG. 3. Cover 116 is held in the down position by detent means or a latching mechanism formed by one latching member 144 attached to an outer surface of housing 16 and a second mating latching member 146 secured to the interior surface of cover 116. When cover 116 is latched in the down position, it cooperates with the outer surfaces of the forward portion 90 of housing section 14 and housing section 16 to form a protective covering for the two optical elements 68 and 70 and the folded shade 126. It will be noted that in the latched position, cover 116 extends across the junction between the forward portion 90 of housing section 14 and housing section 16 thereby releasably locking the two housing sections in the folded position.

To erect camera 10, cover 116 is grasped at its free end and lifted to separate latching members 144 and 146 thereby permitting biasing spring 112 to raise the mirror housing 100 to its extended position along with cover 116. The disengagement of cover 116 from the upper blade flanges 130 causes springs 132 to erect the shade 126 from its folded position to the light-blocking position. Raising cover 116 also enables housing sections 14 and 16 to be moved to the extended position by grasping either one of the housing sections 14 or 16 and moving it upwardly and rearwardly until the erecting link 140 locks the housing sections in their extended position. As housing sections 14 and 16 approach the extended position, the counterclockwise rotation of housing section 14 about pivot 15 causes the eye lens erecting link 117 to become disengaged from the outer surface of housing section 16 thus permitting biasing spring 114 to move the lens 70 to the fully extended position. Thus, it has been shown that the eye lens erecting link 117 combined with biasing spring 114 provides means which are responsive to movement of housing sections 14 and 16 between the folded and extended positions for automatically moving the eye lens 70 between its operative and inoperative positions.

Reviewing the operation of folding and erecting camera 10, the camera may be erected by unlatching the viewing device cover 116 and lifting the upper housing sections until the erecting link 140 locks at which time both the housing sections and the viewing device 64 are fully erected. To fold camera 10, the erecting link 140 is disengaged and then by pushing downwardly on the top of the viewing device cover 116 the entire camera, including the viewing device, may be folded and latched in the folded position.

While camera 10, for the purposes of this disclosure, has been shown to employ a single lens reflex type of optical system, it will be readily apparent to one skilled in the art that the folding or collapsible viewing device structure, with a few modifications, may be incorporated into a non-reflex type of folding camera. For example, by substituting a lens for curved mirror 68, changing lens housing 100 to an open frame type similar to lens housing 102, and providing an opening in the forward end of shade 126 for admitting light to the substituted lens, the viewing device 64 may be converted into a direct viewing or telescope type of viewfinder.

From the foregoing, it can be seen that there has been disclosed a compact folding camera having first and second sections coupled for movement between folded and extended positions, a viewing device including first and second optical elements coupled to the first housing section, and that the camera is provided with means responsive to movement of the first and second housing sections between the folded and extended positions for moving at least one of the first and second optical elements between a compact, folded, inoperative position and an extended, operative position.

Since certain changes may be made in the above folding camera without departing from the scope of the invention herein involved, it is intended that all matter contained in the above description or shown in the accompanying drawings shall be interpreted as being illustrative and not in a limiting sense.

What is claimed is:

1. A compact folding camera including a folding viewing device for providing an image of a scene to be photographed comprising:

first and second housing sections coupled for movement between folded and extended positions;

a folding viewing device mounted on said first housing section and including first and second optical means operatively associable with each other for providing said image, said first and second optical means being coupled to said first housing section for movement relative to one another between inoperative and operative positions; and means responsive to movement of said first and second housing sections from said folded position toward said extended position for automatically moving said first optical means from said inoperative position to said operative position.

2. A compact folding camera as defined in claim 1 wherein said means responsive to movement of said first and second housing sections include biasing means for urging said first optical means towards said operative position.

3. A compact folding camera as defined in claim 2 wherein said means responsive to movement further include erecting means responsive to the movement of said second housing section toward said extended position for locating and maintaining said first optical means in said operative position against the force of said biasing means.

4. A compact folding camera including a viewing device for providing an image of a scene to be photographed comprising:

first and second housing sections coupled for movement between folded and extended positions;

first and second optical means operatively associable with each other for providing said image, said first and second optical means being coupled to said first housing section for movement relative to one another between inoperative and operative positions; and means responsive to movement of said first and second housing sections from said folded position toward said extended position for moving said first optical means from said inoperative position to said operative position, said means responsive to movement including biasing means for urging said first optical means towards said operative position and erecting means coupled between said first optical means and said first housing section for locating and maintaining said first optical means in said operative position against the force of said biasing means, said erecting means being engageable with said second housing section in said folded position for locating and maintaining said first optical means in said inoperative position and being disengageable from said second housing section as the latter approaches said extended position for locating and maintaining said first optical means in said operative position.

5. A compact folding camera including a folding viewing device for providing an image of a scene to be photographed comprising:

first and second housing sections coupled for movement between folded and extended positions;

a folding viewing device mounted on said first housing section and including first and second optical means operatively associable with each other for providing said image, said first and second optical means being coupled to said first housing section for movement relative to one another between inoperative and operative positions; and means responsive to movement of said first and second housing sections from said extended position toward said folded position for automatically moving said first optical means from said operative position to said inoperative position.

6. A compact folding camera as defined in claim 5 wherein said means responsive to movement of said first and second housing sections include biasing means for resiliently urging said first optical means toward said operative position, and erecting means responsive to the movement of said second housing section toward said folded position for locating and maintaining said first optical means in said inoperative position against the force of said biasing means.

7. A compact folding camera including a viewing device for providing an image of a scene to be photographed comprising:

first and second housing sections coupled for movement between folded and extended positions;

first and second optical means operatively associable with each other for providing said image, said first and second optical means being coupled to said first housing section for movement between inoperative and operative positions; and means responsive to movement of said first and second housing sections from said extended position toward said folded position for moving said first optical means from said operative position to said inoperative position, said means responsive to movement including biasing means for resiliently urging said first optical means toward said operative position and erecting means responsive to movement of said second housing section toward said folded position for locating and maintaining said first optical means in said inoperative position against the force of said biasing means, said erecting means being coupled between said first optical means and said first housing section and being movable between positions locating and maintaining said first optical means in said operative and inoperative positions, said erecting means being engageable with and movable by said second housing section as the latter is moved from said extended position to said folded position for locating and maintaining said first optical means in said inoperative position.

8. A compact folding camera including a folding viewing device for providing an image of a scene to be photographed comprising:

first and second housing sections coupled for movement between folded and extended positions;

a folding viewing device mounted on said first housing section and including first and second optical means operatively associable with each other for providing said image, said first and second optical means being coupled to said first housing section for movement relative to one another between inoperative and operative positions; and means responsive to movement of said first and second housing sections between said folded and extended positions for automatically moving said first optical means between said inoperative and operative positions.

9. A compact folding camera as defined in claim 8 wherein said first housing section includes recessed portions for receiving said first and second optical means in said inoperative position to provide said viewing device with a low vertical profile when said camera is folded in comparison to its vertical profile when said camera is extended.

10. A compact folding camera as defined in claim 9 wherein said first and second optical means extend outwardly from said first housing section when in said operative position and are contained in substantially the same plane as said first housing section when located in said inoperative position.

11. A compact folding camera including a viewing device for providing an image of a scene to be photographed comprising:

first and second housing sections coupled for movement between folded and extended positions, said first housing section including recessed portions therein;

first and second optical means operatively associable with each other for providing said image, said first and second optical means being coupled to said first housing section for movement relative to one another between an inoperative position wherein said first and second optical means are located in end-to-end relation with one another and are contained in said recessed portions of said first housing section so as to be substantially in the same plane as said first housing section to provide said viewing device with a low vertical profile when said camera is folded in comparison to its vertical profile when said camera is extended, and an extended position wherein said first and second optical means extend outwardly from said first housing section and cooperate with one another to provide said image.

12. A compact folding camera as defined in claim 10 wherein said first and second optical means are pivotally coupled to said first housing section and are adapted to pivot in opposite directions between their respective inoperative and operative positions.

13. A compact folding camera as defined in claim 11 wherein said first and second optical means are pivotally coupled to said first housing section and are adapted to pivot in opposite directions between their respective inoperative and operative positions, and said second optical means includes a concave reflective surface and said first optical means includes an eye lens.

14. A compact folding camera including a viewing device for providing an image of a scene to be photographed comprising:

first and second housing sections coupled for movement between folded and extended positions;

first and second optical means operatively associable with each other for providing said image, said first and second optical means being coupled to said first housing section for movement relative to one another between inoperative and operative positions;

means responsive to movement of said first and second housing sections between said folded and extended positions for moving said first optical means between said inoperative and operative positions; and means for reducing the admission of ambient light between said first and second optical means in said operative position to prevent said ambient light from obscuring said image.

15. A compact folding camera as defined in claim 14 wherein said means for reducing the admission of ambient light includes cover means associated with said viewing device, said cover means being positionable over said first and second optical means in said operative position.

16. A compact folding camera as defined in claim 15 wherein said means for reducing admission of ambient light further includes a collapsible shade coupled to said first housing section, said collapsible shade being movable between a collapsed position and an erected position wherein said collapsible shade is adapted to cooperate with said cover means to further reduce admission of ambient light between said first and second optical means.

17. A compact folding camera as defined in claim 16 wherein said first optical means includes an eye lens and a housing for supporting said eye lens, said housing being configured to further reduce the admission of ambient light between said first and second optical means.

18. A compact folding camera as defined in claim 8 further including cover means associated with said viewing device, said cover means being adapted to cooperate with portions of said first and second housing sections in said folded position to form a protective covering for said first and second optical means.

19. A compact folding camera as defined in claim 18 further including a collapsible shade associated with said viewing device wherein said cover means in cooperation with said first and second housing sections in said folded position also forms a protective covering for said collapsible shade.

20. A compact folding camera as defined in claim 18 wherein said cover means forms a portion of an erecting system for moving said second optical means between said operative and inoperative positions.

21. A compact folding camera including a viewing device for providing an image of a scene to be photographed comprising:

first and second housing sections coupled for movement between folded and extended positions;

first and second optical means operatively associable with each other for providing said image, said first and second optical means being coupled to said first housing section for movement relative to one another between inoperative and operative positions;

means responsive to movement of said first and second housing sections between said folded and extended positions for moving said first optical means between said inoperative and operative positions;

cover means associated with said viewing device, said cover means being adapted to cooperate with portions of said first and second housing sections located in said folded position to form a protective covering for said first and second optical means, said cover means further being configured to form a portion of an erecting system for moving said second optical means between said operative and inoperative positions; and a collapsible shade movable between a collapsed position and an erected position, said cover means being adapted to engage said collapsible shade for moving said collapsible shade from said erected position to said collapsed position and being disengageable from said collapsible shade for permitting said collapsible shade to be moved to said erected position.

22. A compact folding camera including a viewing device for providing an image of a scene to be photographed comprising:

first and second housing sections coupled for movement between folded and extended positions;

first and second optical means operatively associable with each other for providing said image, said first and second optical means being coupled to said first housing section for movement relative to one another between inoperative and operative positions;

means responsive to movement of said first and second housing sections between said folded and extended positions for moving said first optical means between said inoperative and operative positions;

cover means associated with said viewing device, said cover means being adapted to cooperate with portions of said first and second housing sections located in said folded position to form a protective covering for said first and second optical means; and detent means, including latching members associated with said cover means and said second housing section, for latching said cover means to said second housing section when said first and second housing sections are in said folded position and said first and second optical means are in said inoperative position.

23. A compact folding camera as defined in claim 22 wherein said cover means extends over said first and second housing sections when latched to said second housing section thereby releasably locking said first and second housing sections in said folded position.

24. A compact folding camera as defined in claim 23 wherein said camera is enabled to be moved from said folded position to said extended position by unlatching said cover means from said second housing section.

25. A compact folding camera as defined in claim 24 wherein said camera may be folded and latched in said folded position once said camera is enabled for movement from said extended position to said folded position by a force applied to said viewing device in a direction toward said first and second housing sections.

26. A compact, folding, reflex camera including a folding viewing device for viewing an image of a scene formed within said camera comprising:

a first housing section, having an aperture therein, and a second housing section coupled to one another for movement between a folded position and an extended position wherein light emanating from said image formed within said camera is directed through said aperture in said first housing section;

a folding viewing device mounted on said first housing section and including first and second optical means operatively associable with each other for forming an image of said scene from said light, said first and second optical means being coupled to said first housing section for movement relative to one another between an inoperative position and an operative position wherein said first and second optical means are in operative relation with said light to form said image when said first and second housing sections are in said extended position; and means responsive to movement of said first and second housing sections between said folded and extended positions for automatically moving said first optical means between said inoperative and operative positions.

27. A compact folding camera as defined in claim 26 wherein said second optical means includes a concave mirror for intercepting and reflecting said light toward first optical means to form a real, erect, unreverted, image of said scene from said light.

28. A compact folding camera as defined in claim 27 wherein said concave mirror comprises an approximately ellipsoid shaped concave mirror.

29. A compact folding camera as defined in claim 28 wherein said first optical means comprises an eye lens for magnifying said image formed by said ellipsoid shaped concave mirror.

30. A compact folding camera including a folding viewing device for providing an image of a scene to be photographed comprising:

a camera housing including at least one section movable between folded and extended position;

a folding viewing device mounted on said movable housing section including first and second optical means operatively associable with each other for providing said image, said first and second optical means being coupled to said movable housing section for movement relative to one another between inoperative and operative positions; and means responsive to movement of said movable housing section between said folded and extended positions for automatically moving said first optical means between said inoperative and operative positions.

31. A compact folding camera as defined in claim 30 wherein said means responsive to movement of said movable housing section includes a second housing section coupled to said movable housing section for movement between folded and extended positions.

32. A compact folding camera including a folding viewing device, comprising:

a housing having at least first and second housing sections coupled for movement between an extended position and a folded position in which said first and second housing sections are disposed in a common plane; and a viewing device coupled to said first housing section for movement between an operative position and an inoperative position in which said viewing device overlies said first and second housing sections to releasably secure said first and second housing sections in said folded position.

33. A compact folding camera as defined in claim 26 wherein said viewing device is of the reflex type and said second optical means includes a mirror.

34. A compact folding camera as defined in claim 26 wherein said viewing device is of the direct viewing type and said second optical means includes a lens.

35. A compact folding camera as defined in claim 30 wherein said second optical means is automatically displaced from its inoperative position to its operative position in response to unfolding said viewing device.

36. A compact folding camera as defined in claim 30 wherein said movable housing section locates said viewing device in operative relationship with other camera optical elements located within said housing when said movable housing is located in its extended position.

37. A compact folding camera as defined in claim 30 wherein said first and second optical means are disposed in end-to-end relation when located in their respective inoperative positions.

38. A compact folding camera as defined in claim 30 wherein said means responsive to movement of said movable housing section include a second housing section coupled to said movable housing section for movement between said folded and erected positions and erecting means engageable with said second housing section for moving said first optical means from said operative to said inoperative position and disengageable from said second housing section for moving said first optical means from said inoperative position to said operative position.

39. A compact folding camera including a folding viewing device for providing an image of a scene to be photographed comprising:
   a camera housing including at least one housing section movable between folded and extended positions;
   a folding viewing device mounted on said movable housing section for movement between a collapsed position wherein said viewing device assumes a compact inoperative position overlying said movable section and an erected position wherein portions of said viewing device are spaced from said movable section to define an optical path within said erected viewing device; and
   a collapsible shade movable with said viewing device between a collapsed position and an erected position wherein said shade light shields said optical path within said erected viewing device.

* * * * *